United States Patent [19]
Hrovat et al.

[11] Patent Number: 5,515,279
[45] Date of Patent: May 7, 1996

[54] METHOD AND APPARATUS CONTROLLING CROSS-AXIS OSCILLATIONS IN A VEHICLE TRACTION CONTROLLER

[75] Inventors: Davorin Hrovat; Minh N. Trans; Craig J. Simonds, all of Dearborn, Mich.

[73] Assignee: Ford Motor Company, Dearborn, Mich.

[21] Appl. No.: 398,824

[22] Filed: Mar. 6, 1995

[51] Int. Cl.$^6$ ............................. B60T 8/32; B60K 28/16
[52] U.S. Cl. ................. 364/426.03; 364/426.04; 180/197; 303/112
[58] Field of Search ............... 364/426.03, 426.02, 364/426.04; 303/119.1, 93, 100, 102, 107, 108, 112, 113.2; 180/197

[56] References Cited

U.S. PATENT DOCUMENTS

| | | | |
|---|---|---|---|
| 5,224,043 | 6/1993 | Tamura et al. | 364/426.03 |
| 5,224,766 | 7/1993 | Oikawa et al. | 303/100 |
| 5,263,548 | 11/1993 | Tsuyama et al. | 180/197 |
| 5,278,761 | 1/1994 | Ander et al. | 364/426.03 |
| 5,313,391 | 5/1994 | Sigl et al. | 364/426.03 |
| 5,325,300 | 6/1994 | Tsuyama et al. | 364/426.03 |
| 5,340,204 | 8/1994 | Okazaki et al. | 303/111 |
| 5,400,865 | 3/1995 | Togai et al. | 180/197 |

Primary Examiner—Kevin J. Teska
Assistant Examiner—Tan Q. Nguyen
Attorney, Agent, or Firm—Allan J. Lippa; Roger L. May

[57] ABSTRACT

An electronic traction controller for a vehicle reduces oscillations between a pair of driving wheels which may occur when the the traction controller attempts to control wheel spin of the driving wheels on surfaces which have differing frictional resistances, such as roads partially covered by snow and ice. The traction controller estimates the coefficient of friction beneath each of the driving wheels, and if the frictional resistance of the surfaces beneath each of the driving wheels varies by more than a predetermined amount, or if only one wheel is spinning, a value indicative of the inertia torque of the driving wheel and powertrain combination is determined, and compared against a predetermined value. A slip error value for each of the driving wheels is generated, which is indicative of the difference between the actual rotational speed of the driving wheel and the desired rotational speed of the driving wheel. If the inertia torque is greater than the predetermined value then braking values for the driving wheels to control wheel spin are generated as a function of the slip error value. The braking values are generated such that a first braking value is generated for the driving wheel which has the higher rotational speed of the two driving wheels, and a second braking value is generated for the other driving wheel, with the second braking value resulting in a braking force which is proportional to the first braking value.

7 Claims, 2 Drawing Sheets

METHOD AND APPARATUS CONTROLLING CROSS-AXIS OSCILLATIONS IN A VEHICLE TRACTION CONTROLLER

FIELD OF THE INVENTION

The present invention relates generally to the field of vehicle traction control and more particularly to the reduction of cross-axis oscillations between a pair of driving wheels when the vehicle is driven on roads having variable frictional resistances.

BACKGROUND OF THE INVENTION

Modern vehicles are increasingly making use of electronic traction control systems to improve vehicle traction and driver control. Such systems typically sense the spinning or slipping of driving wheels of the vehicle and vary the throttle or the braking force to the slipping or spinning wheel. Control of the spinning of the driving wheels via brake intervention is of particular use when the vehicle is driven over surfaces in which frictional resistance of the surface may substantially vary between the driving wheels. For instance, in winter driving conditions, the road surface may only be partially cleared resulting in occasion patches of snow or ice. Under such conditions, when one or more of the driving wheels is detected to be spinning, certain traction control systems apply a braking force to the spinning wheel(s).

While such a procedure has been found to improve vehicle traction, it can also create cross-axis forces which lead to spinning of the other driving wheel. Known vehicle traction controllers respond by applying a braking force to the newly spinning driving wheel. Occasionally during sudden throttle tip-in, the consequence of such a response is an oscillation of spinning between the driving wheels. The reduction of spinning of one wheel causes the spinning of the other wheel, the reduction of which causes the spinning of the originally spinning wheel.

As a result of such phenomena, there is a need for a traction control system which reduces cross-axis oscillations of wheel spinning which occasionally occurs on roads with differing frictional resistances.

SUMMARY OF THE INVENTION

It is an object of the present invention to improve vehicle traction and to reduce cross-axis oscillations during operation of a vehicle over road surfaces with variable frictional resistances.

According to a first aspect of the invention, in a vehicle which includes a drivetrain and a pair of driving wheels, with the combination of the drivetrain and the driving wheels being characterized by an inertia torque, the spinning of driving wheels during operation of a vehicle on surfaces with variable coefficients of friction is controlled by estimating the coefficient of friction of the surface beneath each of the driving wheels, and determining the rotational speed of each of the driving wheels. If the coefficient of friction of the surface beneath each of the driving wheels differs by more than a predetermined frictional difference value, then it is determined if both driving wheels are spinning. If so, then a first value, which is indicative of the inertia torque of the combination of the drivetrain and driving wheel is determined and compared to a predetermined torque value. If the first value exceeds the predetermined torque value then spinning of the driving wheels is reduced by applying a first braking force to the driving wheel having the highest rotational speed of the two driving wheels, and substantially simultaneously applying a second braking force to the other driving wheel, the second braking force being proportional to the first braking force.

Use of the foregoing techniques offers a significant advantage in controlling wheel spin on variable road surfaces. Application of a braking force on the wheel which has the lower rotational speed, and consequently which is generally on the surface with the most frictional resistance reduces the chance of spinning of that wheel by a torque caused by application of a braking force on the other wheel. Vehicle control is improved and mechanical stress on the drivetrain components is reduced.

These and other features and advantages of the present invention may be better understood by considering the following detailed description of preferred embodiments of the invention. In the course of this description, reference will be made to the attached drawings.

DETAILED DESCRIPTION

Figure 1:
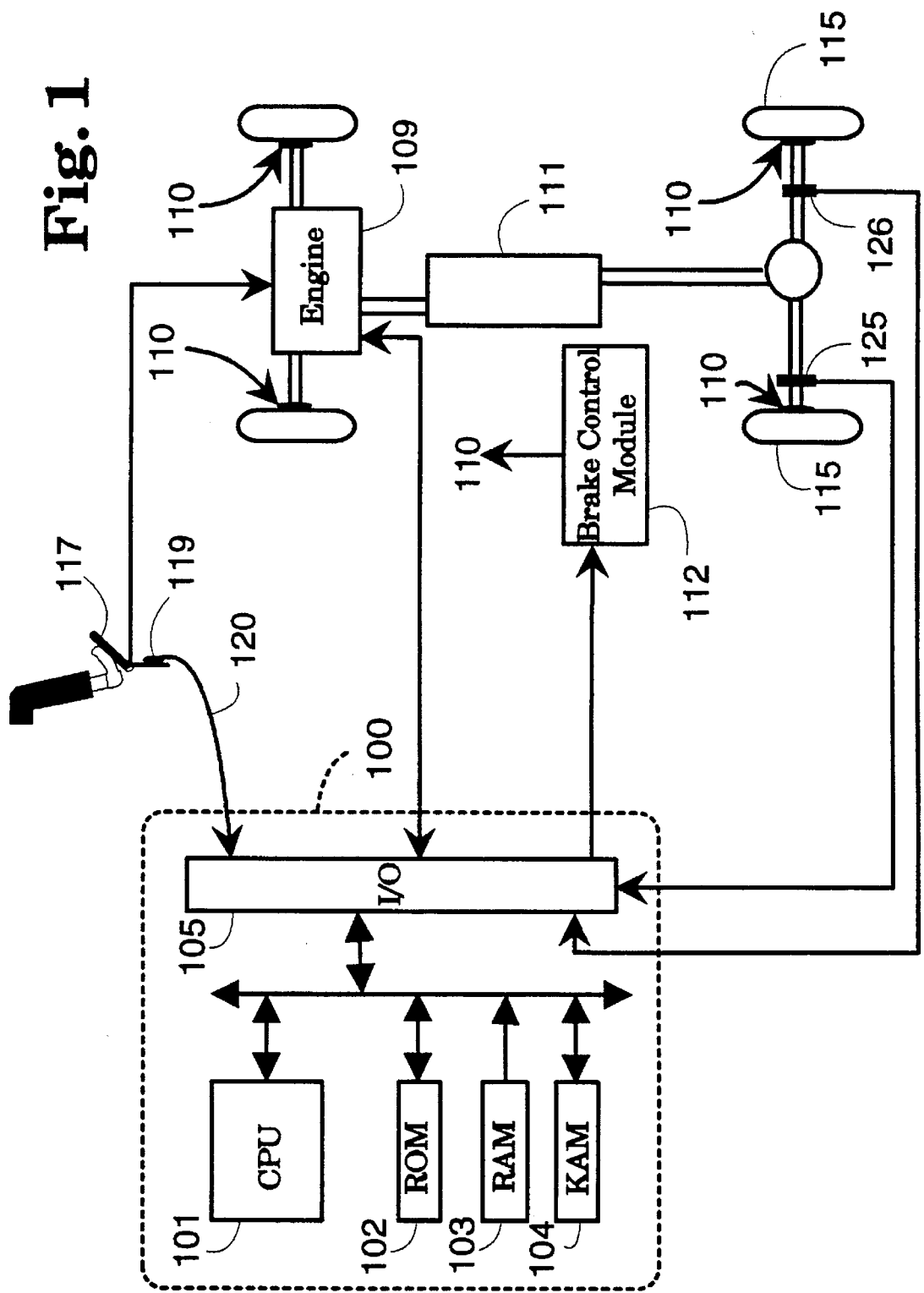
FIG. 1 is a schematic diagram of a system which embodies the principles of the invention.

In FIG. 1 of the drawings a powertrain controller 100 controls the operation of a vehicle powertrain which includes a conventional internal combustion engine 109, transmission and drivetrain, seen generally at 111, and a braking control module seen at 112, which includes anti-lock braking and traction control capability. The powertrain controller preferably includes a central processing unit 101, a read-only memory (ROM) 102 for storing control programs, a random-access memory (RAM) 103 for temporary data storage, a keep-alive-memory (KAM) 104 for storing learned values, and a conventional data bus and I/O ports 105 for transmitting and receiving signals to and from the vehicle powertrain.

In FIG. 1 a pair of driving wheels is shown at 115. The driving wheels 115 are illustrated in FIG. 1 as being the rear wheels of the vehicle. Alternatively, the driving wheels may be the front wheels of the vehicle, or all four-wheels of the vehicle.

The vehicle preferably includes an electronic throttle controller which operates in response to gas pedal position and other inputs such as engine speed and wheel slip and spin. The position of the gas pedal, seen at 117, is preferably sensed by a gas pedal position sensor 119 which takes a conventional form in order to sense the position of the gas pedal and transmit a representative signal 120 to the powertrain controller 100. The components of the vehicle powertrain such as the engine 109, transmission and drivetrain 111 and the brake control module 112 are conventional and operate in conjunction with powertrain controller 100 to implement a traction control system. Wheel speed sensors, one of which is shown at 125, detect the rotational speed of each of the wheels of the vehicle and transmit a representative signal to the powertrain controller 100. The wheel speed sensors preferably take the form of Hall effect sensors. The anti-lock braking system is conventional and preferably is capable of independently modulating the braking force upon each wheel, either in response to input from the driver via the vehicle brake pedal (not shown) or in response to input from the electronic traction controller.

The vehicle also preferably employs a torque estimation technique to determine the torque at the driving wheels. A preferred form of torque estimation to determine powertrain torque is described in a pending U.S. application Ser. No. 07/973,460 entitled "Robust Torque Estimation Using Multitudes of Models" assigned to the Ford Motor Company and filed in the names of Davorin Hrovat and Lee-Frei Chen on Nov. 9, 1992. Preferably torque estimation to determine torque from braking forces is also employed in determining the torque at each of the driving wheels. A preferred form of torque estimation to determine such a torque is described in a pending U.S. application entitled "Method for Estimating a Pressure in a Pressure Actuated Controller", Ser. No. 329,928, assigned to the Ford Motor Company and filed on Oct. 27, 1994, in the names Davorin Hrovat and Minh Ngoc Tran. Alternatively, the torque at each of the driving wheels may be detected by a wheel torque sensor such as seen at 126. Such a sensor may be of conventional type, such as a model manufactured by Lucas Schaevitz Company.

As explained previously, conventional traction controllers sometimes experience oscillations between a pair of the driving wheels of the vehicle when the vehicle is driven over surfaces which subject each of the driving wheels to different frictional resistances. Under such a situation, the left wheel may experience an initial spin. In response, the traction controller will apply a braking force at the wheel to reduce spinning of the wheel. As spinning of the left wheel is reduced, a torque on the right wheel is created which causes the right wheel to start spinning. Application by the traction controller of a braking force to the right wheel reduces spinning of the wheel. As spinning of the right wheel is reduced a torque on the left wheel is created which causes the left wheel to start spinning. For the purposes of the present specification, such a phenomena is referred to as cross axis oscillation. Under certain road conditions, this process can repeat itself until the road condition stabilizes to one where both wheels are positioned upon surfaces with similar frictional resistances. As used in the present specification, the term "spinning" is understood to mean not just rotation of a vehicle wheel, but rotation of the wheel at a speed faster than required to maintain or propel the vehicle at a particular speed.

Figure 2:
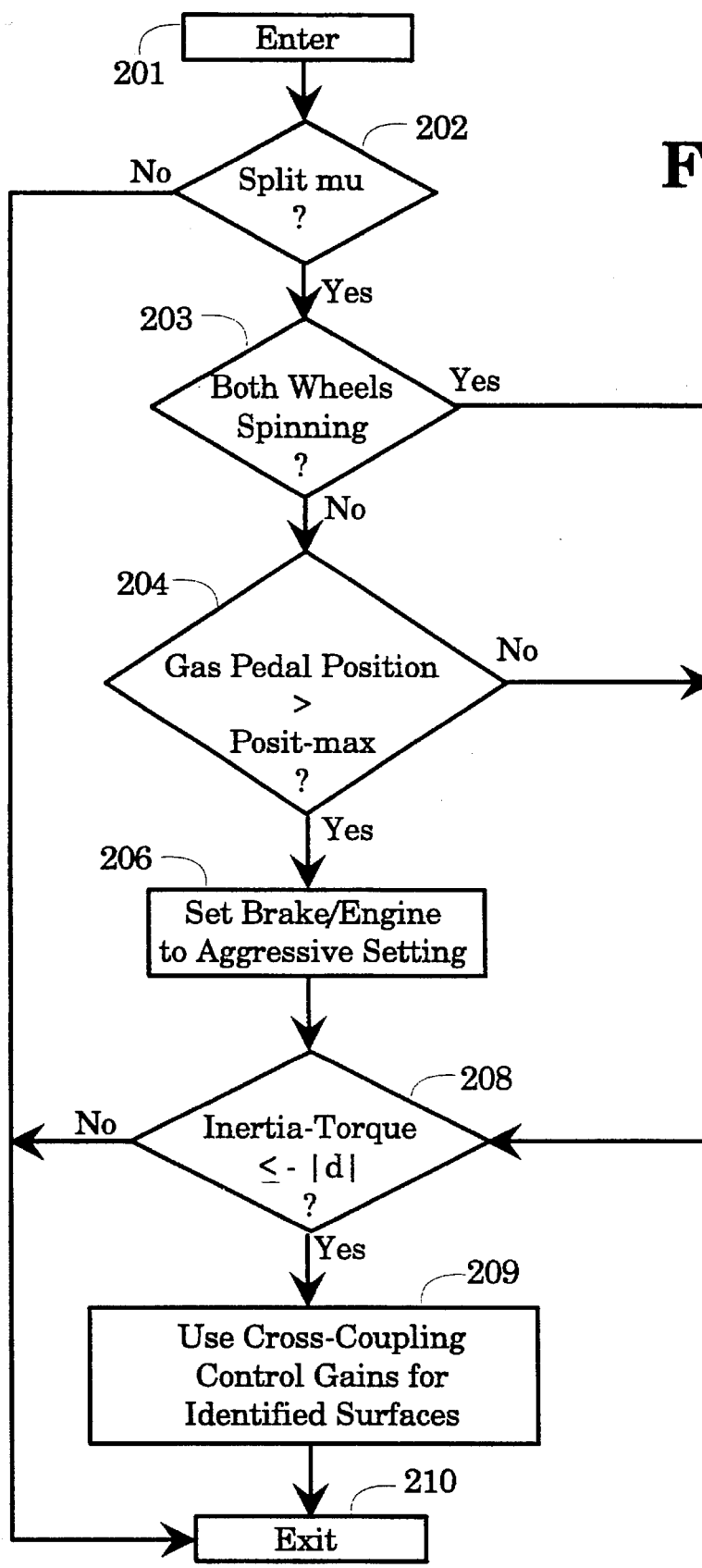
FIG. 2 is a flow chart of the operation of a preferred embodiment.

A preferred embodiment advantageously controls the modulation of brake pressure on the driving wheels of the vehicle in a manner which reduces oscillations of the type described above. FIG. 2 of the drawings is flowchart showing the steps executed by a preferred embodiment to implement a brake oscillation reduction routine. The routine shown in FIG. 2 is executed periodically by brake control module 112 as pan of a traction control routine. Preferably the traction control routine is executed every ten milliseconds.

The brake oscillation reduction routine is entered at step 201 and at step 202 an initial check is made to determine if each of the driving wheels are on surfaces with approximately equal coefficients of friction. Wheel spin of each of the driving wheels is checked by conventional methods and if only one wheel is found to be spinning then it is assumed that the vehicle is being driven on a surface with differing frictional resistance. If no wheels are spinning then the routine is exited. If both wheels are found to be spinning then the coefficient of friction beneath each of the wheels is estimated and compared. If the coefficient of friction between the driving wheels differs by less than a predetermined amount, then the routine is exited at 210. In such a situation, the driving wheels are on surfaces of approximately equal frictional resistances and the problem of cross-axis oscillations as described above is minimal. If at 202, the coefficient of friction between the driving wheels differs by more than the predetermined amount, or if either one or both wheels are spinning then the routine is executed in order to minimize cross axis oscillations which may occur because of the differing surface beneath the driving wheels. The estimation of the frictional resistance beneath each of the driving wheels is advantageously performed by torque estimation techniques as described in a pending U.S. application, Ser. No. 07/973,460, entitled "Robust Torque Estimation Using Multitudes of Models" assigned to the Ford Motor Company and filed in the names of Davorin Hrovat and Lee-Frei Chen on Nov. 12, 1992, and which is hereby incorporated by reference. The predetermined frictional difference amount is preferably determined empirically and takes into account the individual characteristics of a particular type of vehicle such as the width, wheelbase, weight and handling characteristics. A typical value for the predetermined frictional difference amount is about 0.1. At 202, a slip error value is also determined for each of the driving wheels. The slip error value is indicative of the difference in the actual rotational speed of the driving wheel and the desired rotational speed of the driving wheel. In practice, the desired rotational speed of each of the driving wheels will typically be about ten percent greater than the actual rotational speed of the non-driving wheels.

At 203, a test is performed to determine if both driving wheels are spinning. As with the similar test at 202, this test is preferably performed by comparing the signal received from the wheel speed sensor for each wheel and comparing the wheel speed of each of the driving wheels against the wheel speed of a non-driving wheel. A wheel speed of a driving wheel which is greater by a predetermined amount, which is typically ten percent greater, than a wheel speed for a non-driving wheel indicates a spinning wheel. A preferred embodiment advantageously reacts differently if both driving wheels are spinning than if only one, or no driving wheels are spinning in order to provide vehicle performance close to that desired by the driver. If either one of the driving wheels is found to be not spinning at step 203, then at steps 204 and 206, the desired vehicle performance is detected, as indicated by the driver through the gas pedal, and engine and brake control variables, which control engine torque and braking force, are set to provide a performance level corresponding to the driver's desired performance level.

At 204, the position of the gas pedal is determined as a function of the signal transmitted by the gas pedal position sensor 119, and is compared to a predetermined gas pedal position value Posit-Max. The convention used herein is that a large gas pedal position value corresponds to a higher level of desired engine power than does a smaller gas pedal position value. The predetermined gas pedal position is preferably an empirically determined value which indicates a boundary between two performance levels of the vehicle. A gas pedal position value which is greater than the predetermined gas pedal position indicates an aggressive driver desired engine performance, and a gas pedal position value which is less than or equal to the predetermined gas pedal position indicates a less aggressive driver desired engine performance. If the gas pedal position value is greater than the predetermined gas pedal position then at 206, engine variables which determine the amount of power generated by the engine are set to a predetermined aggressive setting. Such variables preferably take the form of variables which control electronic throttle position, fuel injection timing and spark timing. Because higher engine output may also require more aggressive application of the brakes, control of the vehicle brakes is also advantageously set to an aggressive setting. Under such a setting, the brake pressure is prepositioned so as to allow quicker response time in application of the brakes initiated by the throttle controller. The routine then continues to step 208. If the gas pedal position value is less than or equal to the predetermined gas pedal position then the engine and brake control is retained at its normal setting and the routine continues to step 208.

At step 208 a value Inertia-Torque, which is indicative of the overall inertia of the driving wheel(s), gear box, transmission, turbine of the vehicle torque converter if the vehicle has an automatic transmission, or of the overall inertia of the driving wheel(s) and flywheel if the vehicle employs a manual transmission is determined according to the following relationship:

$$\text{Inertia-Torque} = I_{up} \, t^2 \frac{d^2\omega}{dt^2}$$

where, $I_{up}$ is the upstream reflected inertia, in kg•m$^2$, of the gear set, driving wheel(s), transmission and torque converter turbine in a vehicle which employs an automatic transmission, and is the upstream inertia in kg•m$^2$ of the driving wheel(s), engine flywheel and gear set in a vehicle which employs a manual transmission;

t is the total drivetrain ratio, which includes the transmission gear ratio and the final drive ratio; and d ω/dt is the derivative with respect to time of the upstream inertia $I_{up}$.

Once the value of Inertia-Torque is calculated, it is compared to a predetermined inertia torque value "d" as shown at 208. Specifically, as seen at 208, Inertia-Torque is compared to the negative of the absolute value of "d". As represented at 208 and in the equation above, the value Inertia-Torque has a negative value while decelerating the spinning wheel, with a larger magnitude representing a higher inertia torque value. The relationship shown at 208 can alternatively be expressed as follows:

Inertia−Torque>|d|

As represented above, the comparison at 208 can be seen to be one in which the value Inertia-Torque is compared to the value "d" to determine if it is greater than the value "d". If this is so, then the reduction of cross-axis oscillations is determined to be necessary and at 209, braking force values are determined to minimize cross-axis oscillations in the driving wheels during braking. The braking force value for each driving wheel is preferably calculated by multiplying an appropriate gain value for the brake on that wheel with the slip error value for that wheel, and adding the product of the cross-coupling gain for the opposite wheel with the slip error value for the opposite wheel.

The gain values for each of the brakes corresponding to the driving wheels are determined in a conventional manner. The cross-coupling control gains are preferably determined as a function of the frictional resistance of the surface beneath each of the wheels, by retrieving the cross-coupling control gains from a table stored in memory and indexed by coefficient of friction. In a preferred embodiment, the cross-coupling control gains are independently retrieved from a table. Alternatively, the first braking force value is retrieved from the table and the second braking force value is calculated as a fraction of the first braking force value. In yet another embodiment, the second braking force is only applied if the inertia torque varies from the predetermined inertia torque value "d" by more than a calibratable amount. In such an embodiment, the difference between the inertia torque value and the predetermined inertia torque value is determined and compared to a predetermined amount. The second braking force is only applied if the difference is greater than the predetermined amount. Use of the cross-coupling gains may also be limited to situations where the cross-axis oscillations occur within a particular frequency range. In such an embodiment, a band-pass filter is employed to filter the slip error values. The band-pass filter preferably will have a pass range of 2–5 Hz which is the frequency range in which the predominant oscillations are expected to occur. Once the cross coupling control gains are determined at 209, the routine is exited at 210. The braking forces applied to the driving wheels as a result of the execution of the brake oscillation reduction routine are preferably applied substantially simultaneously. However, minor delays in application of the braking forces between the driving wheels are also believed to be adequate to achieve beneficial reduction in cross axis oscillations.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In a vehicle which includes a drivetrain and a pair of driving wheels, the combination of said drivetrain and driving wheels creating an inertia torque, a method of controlling the spinning of said driving wheels during operation of the vehicle on surfaces with variable coefficients of friction, comprising the steps of:

estimating the coefficient of friction of the surface beneath each of the driving wheels and determining a first rotational speed value which corresponds to the rotational speed of a first of said driving wheels and a second rotational speed value which corresponds to the rotational speed of a second of said driving wheels;

if the coefficient of friction of the surface beneath each of the driving wheels differs by more than a predetermined frictional difference value, then determining, as a function of said first rotational speed value and said second rotational speed value, if both driving wheels are spinning and if so, then, determining an inertia torque value indicative of the inertia torque of the combination of the drivetrain and driving wheel, comparing said inertia torque value to a predetermined torque value, if said inertia torque value exceeds said predetermined torque value then reducing the spinning of the driving wheels by generating a first braking force value corresponding to the driving wheel having the higher rotational speed of the two driving wheels, and generating, as a function of said first braking force value, a second braking force value corresponding to the driving wheel having the lower rotational speed of the two driving wheels, said second braking force value corresponding to a braking force which is smaller in magnitude than said first braking force value, and substantially simultaneously applying braking forces corresponding to said first and said second braking force values, to each of said driving wheels.

2. The method as set forth in claim 1 comprising the additional steps of responding to only one driving wheel spinning by, generating a gas pedal position value indicative of gas pedal position;

comparing said gas pedal position to a predetermined value;

if said gas pedal position indicates a desired amount of power by the driver of said vehicle which is greater than said predetermined value, then, setting a brake control value which determines the amount of braking force to be applied to the wheels of said vehicle to a brake control setting, and setting a throttle control value which determines the aircharge entering combustion chambers of the vehicle engine to a throttle control setting, said brake control setting and said throttle control setting corresponding to and defining a level of vehicle performance as indicated by said gas pedal position, determining said inertia torque value, comparing said inertia torque value to a predetermined torque value, if said inertia torque value exceeds said predetermined torque value then reducing the spinning of the driving wheels by generating a third braking force value corresponding to the driving wheel having the higher rotational speed of the two driving wheels, and generating, as a function of said third braking force value, a fourth braking force value corresponding to the driving wheel having the lower rotational speed of the two driving wheels, said fourth braking force value corresponding to a braking force which is smaller in magnitude than said third braking force value, and substantially simultaneously applying braking forces corresponding to said third and said fourth braking force values, to each of said driving wheels, if said gas pedal position indicates a desired amount of power by the driver of said vehicle which is not greater than said predetermined value, then, determining said inertia torque value indicative of the inertia torque of the vehicle, comparing said inertia torque value to a predetermined torque value, if said inertia torque value exceeds said predetermined torque value then reducing the spinning of the driving wheels by generating a fifth braking force value corresponding to the driving wheel having the higher rotational speed of the two driving wheels, and generating, as a function of said fifth braking force value, a sixth braking force value corresponding to the driving wheel having the lower rotational speed of the two driving wheels, said sixth braking force value corresponding to a braking force which is smaller in magnitude than said fifth braking force value, and substantially simultaneously applying braking forces corresponding to said fifth and said sixth braking force values, to each of said driving wheels.

3. The method as set forth in claim 1 wherein the step of applying a first braking force to the driving wheel having the highest rotational speed of the two driving wheels comprises the step of determining said first braking force by determining a gain value, indicative of a braking force, for said driving wheel;

generating an actual speed value indicative of the actual rotational speed of said driving wheel;

determining a slip error value for said driving wheel by taking the difference between said actual speed value and a desired speed which is indicative of a desired rotational speed of said driving wheel;

multiplying said gain value with said slip error value to form a first intermediate value;

determining a slip error value for the other driving wheel by taking the difference between the actual rotational speed of the other driving wheel and a desired speed which is indicative of a desired rotational speed of the other driving wheel;

retrieving a cross-coupling gain value, indicative of the frictional resistance of a surface beneath each of the driving wheels, for said other driving wheel;

multiplying the slip error value and the cross-coupling gain value for the other driving wheel to form a second intermediate value; and adding said first intermediate value to said second intermediate value to determine said first braking force.

4. A method of controlling across-the-axis oscillations in a vehicle which utilizes a traction controller, comprising:

determining if a frictional resistance of the surface below each wheel of a pair of driving wheels differs by more than a predetermined frictional difference value, and determining the rotational speed of each of the driving wheels;

responding to the frictional resistance of the surface below each of the wheels of the pair of driving wheels differing by more than the predetermined frictional difference value by determining if both wheels of the pair of driving wheels are spinning;

responding to spinning of both wheels of the pair of driving wheels by determining an inertia torque value which is indicative of an inertia torque of the vehicle drivetrain and driving wheels, comparing said inertia torque value to a predetermined torque value, and if said inertia torque value is greater than said predetermined torque value, then applying a first braking force to the driving wheel having the higher rotational speed of the two driving wheels, and applying a second braking force to the other driving wheel, said second braking force being proportional to said first braking force;

responding to the spinning of only one driving wheel by determining the amount of engine power desired by a driver of the vehicle by determining the position of the vehicle gas pedal;

comparing the amount of desired power to a predetermined power value;

if said amount of desired power exceeds said predetermined power value then setting an engine torque value which determines the amount of torque produced by the vehicle engine to a first torque value and setting a braking force value which determines the amount of braking force to be applied to the wheels of the vehicle to a third braking force value, and determining said inertia torque value, comparing said inertia torque value to said predetermined torque value, and if said inertia torque value is greater than said predetermined torque value, then applying a fourth braking force to the driving wheel having the higher rotational speed of the two driving wheels, and applying a fifth braking force to the other driving wheel, said fifth braking force being proportional to said fourth braking force;

if said amount of desired power does not exceed said predetermined power value then determining said inertia torque value, comparing said inertia torque value to said predetermined torque value, and if said inertia torque value is greater than said predetermined torque value, then applying a sixth braking force to the driving wheel having the higher rotational speed of the two driving wheels, and applying a seventh braking force to the other driving wheel, said seventh braking force being proportional to said sixth braking force.

5. Apparatus for controlling spinning of driving wheels of a vehicle, during operation of the vehicle on surfaces with variable coefficients of friction comprising, in combination:

means for estimating the coefficient of friction of the surface beneath each of the driving wheels and determining a first rotational speed value which corresponds to the rotational speed of a first of said driving wheels and a second rotational speed value which corresponds to the rotational speed of a second of said driving wheels;

means, responsive to the coefficient of friction of the surface beneath each of the driving wheels differing by more than a predetermined frictional difference value, for determining, as a function of said first rotational speed value and said second rotational speed value, if both driving wheels are spinning; and means, responsive to spinning of both driving wheels, for determining an inertia torque value indicative of an inertia torque of the combination of the drivetrain and driving wheel, comparing said inertia torque value to a predetermined torque value, if said inertia torque value exceeds said predetermined torque value then reducing the spinning of the driving wheels by generating a first braking force value corresponding to the driving wheel having the higher rotational speed of the two driving wheels, and generating, as a function of said first braking force value, a second braking force value corresponding to the driving wheel having the lower rotational speed of the two driving wheels, said second braking force value corresponding to a braking force which is smaller in magnitude than said first braking force value, and substantially simultaneously applying braking forces corresponding to said first and said second braking force values, to each of said driving wheels.

6. Apparatus as set forth in claim 5 further comprising means, responsive to spinning of only one driving wheel comprising:

means for generating a gas pedal position value indicative of gas pedal position;

means for comparing said gas pedal position to a predetermined value;

means, responsive to said gas pedal position indicating a desired amount of power by the driver of said vehicle which is greater than said predetermined value, for setting a brake control value which determines the amount of braking force to be applied to the wheels of said vehicle to a brake control setting, and setting a throttle control value which determines the aircharge entering combustion chambers of the vehicle engine to a throttle-control setting, said brake control setting and said throttle control setting corresponding to and defining a level of vehicle performance as indicated by said gas pedal position, determining said inertia torque value, and comparing said inertia torque value to a predetermined torque value, means, responsive to said inertia torque value exceeding said predetermined torque value for reducing the spinning of the driving wheels by generating a third braking force value corresponding to the driving wheel having the higher rotational speed of the two driving wheels, and generating, as a function of said third braking force value, a fourth braking force value corresponding to the driving wheel having the lower rotational speed of the two driving wheels, said fourth braking force value corresponding to a braking force which is smaller in magnitude than said third braking force value, and substantially simultaneously applying braking forces corresponding to said third and said fourth braking force values, to each of said driving wheels, means, responsive to said gas pedal position indicating a desired amount of power by the driver of said vehicle which is not greater than said predetermined value, for determining said inertia torque value indicative of the inertia torque of the vehicle, and comparing said inertia torque value to a predetermined torque value, and means, responsive to said inertia torque value exceeding said predetermined torque value for reducing the spinning of the driving wheels by generating a fifth braking force value corresponding to the driving wheel having the higher rotational speed of the two driving wheels, and generating, as a function of said fifth braking force value, a sixth braking force value corresponding to the driving wheel having the lower rotational speed of the two driving wheels, said sixth braking force value corresponding to a braking force which is smaller in magnitude than said fifth braking force value, and substantially simultaneously applying braking forces corresponding to said fifth and said sixth braking force values, to each of said driving wheels.

7. Apparatus as set forth in claim 5 wherein the means for applying a first braking force to the driving wheel having the highest rotational speed of the two driving wheels comprises a means for determining said said first braking force which comprises:

means for determining a gain value, indicative of a braking force for said driving wheel, means for generating an actual speed value indicative of the actual rotational speed of said driving wheel, means for determining a slip error value for said driving wheel by taking the difference between said actual speed value and a desired speed which is indicative of a desired rotational speed of said driving wheel;

means for multiplying said gain value with said slip error value to form a first intermediate value;

means for determining a slip error value for the other driving wheel by taking the difference between the actual rotational speed of the other driving wheel and a desired speed which is indicative of a desired rotational speed of the other driving wheel;

means for retrieving a cross-coupling gain value, indicative of the frictional resistance of a surface beneath each of the driving wheels, for said other driving wheel;

means for multiplying the slip error value and the cross-coupling gain value for the other driving wheel to form a second intermediate value; and means for adding said first intermediate value to said second intermediate value to determine said first braking force.

* * * * *